Dec. 23, 1941. E. B. FERNBERG 2,267,558
FASTENER
Filed Sept. 15, 1939 2 Sheets-Sheet 1
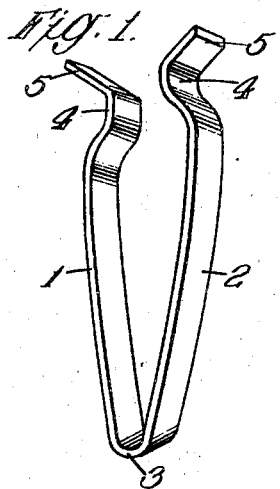
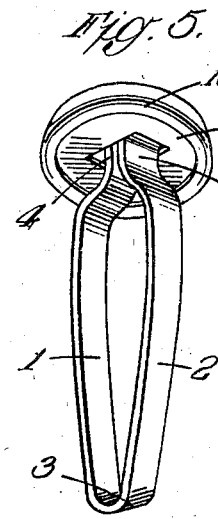
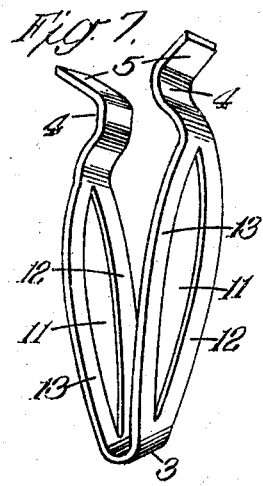
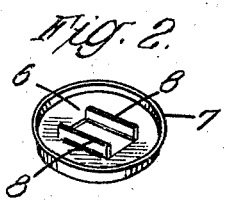
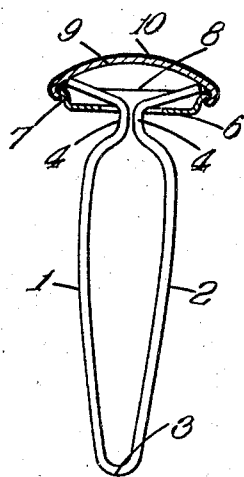
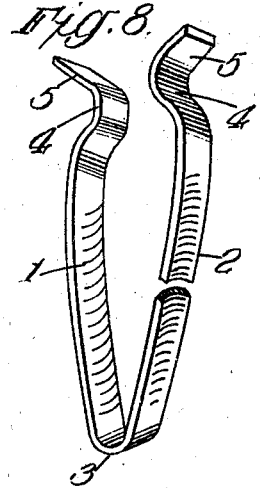
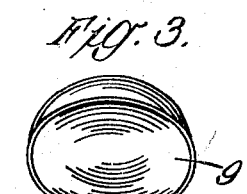
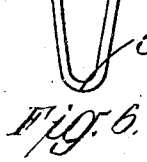
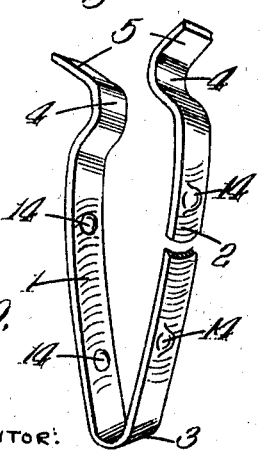
INVENTOR:
ERIC BIRGER FERNBERG
By Leon Edelson
ATTORNEY Dec. 23, 1941.  E. B. FERNBERG  2,267,558
FASTENER
Filed Sept. 15, 1939   2 Sheets-Sheet 2

INVENTOR:
ERIC BIRGER FERNBERG
By Lew Edelson
ATTORNEY

Patented Dec. 23, 1941

2,267,558

UNITED STATES PATENT OFFICE 2,267,558

FASTENER

Eric Birger Fernberg, Pinner, Middlesex, England, assignor to Ferntol Patents Limited, London, England Application September 15, 1939, Serial No. 295,092
In Great Britain September 15, 1938

8 Claims. (Cl. 24—214)

The present invention relates to fasteners and, although not exclusively limited thereto, is of particular advantage for the purpose of securing carpets to wood or metal floors of automobiles.

It has been found that in the automobile industry there is a very wide variation in the thickness of the carpet used and of the felt and/or insulation used, for example, for sound-deadening or heat insulation purposes, under the carpet. Consequently, a fastener which is suitable for securing a carpet in one car is usually unsuitable for other cars.

It is an object of the present invention to provide a fastener which will accommodate this variation in thickness of the material to be fastened, so that the same fasteners can be used for a variety of purposes.

A further object is to provide a fastener which is simple in construction and operation for accomplishing the desired results immediately above referred to.

A further object is to provide a fastener which may advantageously be used where the apertures in two members to be fastened are not quite in alignment.

A further object is to provide a fastener which can be used where the opposing faces of the members, due to bending or other causes, are not in contact.

A further object is to provide a fastener which can be used where it is desired to hold the two members to be fastened in spaced relationship.

Further objects will appear as the description proceeds.

In order that the invention may be clearly understood it will now be described with reference to the accompanying drawings in which:

Figures 1 to 4 constitute perspective views of the separated parts of one form of the invention;

Figure 5 is a perspective view of the fastener shown in Figures 1 to 4 when assembled;

Figure 6 is a sectional elevation of the fastener shown in Figure 5;

Figures 7, 8 and 9 are perspective views of modifications of the stud shown in Figure 1;

Figure 10:
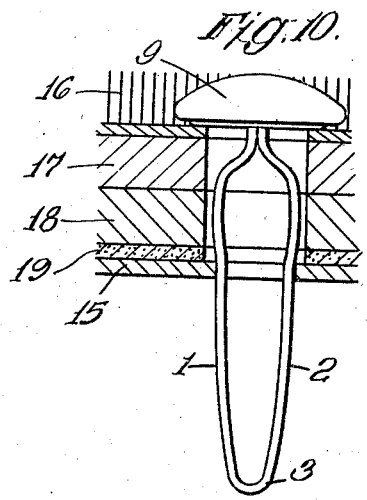
Figures 10, 11 and 12 show the fastener assembly for use as a carpet fastener.

Referring to Figures 1 to 6 illustrating a preferred form of fastener, the stud shown in Figure 1 comprises a strip of spring steel bent at its centre to form two symmetrical outwardly bowed legs 1, 2 and a pointed or rounded nose 3; the free ends are then bent inwardly to form a neck portion 4, whereupon the free ends are again bent to form a pair of outwardly turned feet 5, which are given a slight inclination in an upward direction.

Around the neck portion 4 is placed a washer 6 (Figure 2) in the form of a shallow cup with an outwardly turned lip 7, and with a rectangular aperture the longer margins of which are turned down to form flanges 8 which prevent the stud from twisting within a button head (Figure 3).

The button head shown in Figure 3 is in the form of a circular shallow cup 9 of metal having cylindrical sides and a top in the form of a shallow dome. The cup 9 is placed dome down in a die (not shown) and the stud and washer dropped therein, so that the feet and washer rest in the cup. A hollow die (not shown) with an internal conical or dished annular end face is then brought down on to the upturned edge of the cup 9 in such manner that the edge is pressed inwardly by the die so as to engage the washer and retain the washer and feet within the button head (Figure 4). The button head may be covered with fabric material 10 (Figure 5) which is placed over the open mouth of the cup-shaped washer and both fabric and cup are turned in over the lip 7 in such a manner that the edge of the fabric is securely gripped between the washer and cup. The button head may be coated with cellulose or paint or the feet of the stud may be cemented or moulded within a synthetic resin head or button.

Figure 7A:
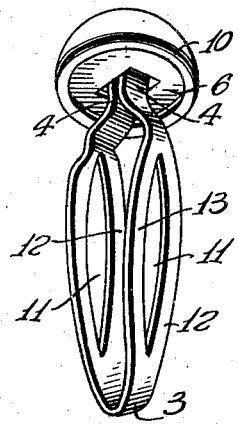
Figures 7A, 8A and 9A are perspective views of modifications of the fasteners respectively employing the studs of Figures 7, 8 and 9.

In a modified form of stud as illustrated in Figure 7, each of the legs is formed with a central longitudinal cut-away portion 11 in the shape of a long narrow oval, so that each leg of the stud comprises two limbs 12 and 13 which may be sprung towards one another. The dimensions of the stud are such that when it is inserted in an aperture, the four outside edges of the two legs engage the aperture, the two legs being sprung towards one another, a comparatively effective frictional gripping effect being obtained in this manner.

Figure 8A:
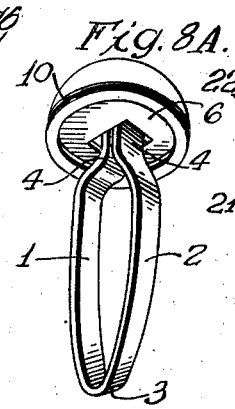

In a further modified form of stud as illustrated in Figure 8, each of the legs 1 and 2 is bowed concavely about its own longitudinal axis from a point adjacent the neck portion 4 to a point adjacent the nose 3.

The stud illustrated in Figure 9 is similar to that illustrated in Figure 8, except that the bowing of each leg 1 and 2 about its own longitudinal axis is opposite to that in Figure 8 i. e. convexedly, whilst each leg is provided with a multiplicity of projecting pips 14, two of which are shown on each leg, which serve to engage the edges of an aperture into which the fastener is pushed.

The pips 14 may, if desired, be formed on any of the studs.

It will be appreciated that any of the studs illustrated in Figures 7, 8, 9 and 10 may be assembled with their feet within a button head or synthetic resin head or button as previously described.

Figure 10 illustrates the fastener of Figure 5 used for securing a carpet to the floor of a vehicle. The steel floor 15 is formed with a series of apertures (one of which is shown in the drawings) of a diameter slightly less than the distance between the bowed legs 1 and 2 of the stud. With the aid of a pointed tool a hole is made through the carpet 16, underfelt 17, insulating material 18 and deadening felt 19 above the aperture in the floor, all of which materials and the arrangement of same being well known in automobile practice. The stud is inserted with the nose 3 first through the hole in the carpet, felts and insulating material, into the aperture in the floor 15. The length of the bowed portion of the fastener is greater than the greatest total thickness of carpet, felts and insulating material likely to be met in practice, so that the fastener enters the aperture in the floor a distance which is greater the less the thickness of the carpet, felts and insulating material. As the fastener enters the aperture in the floor the bowed legs are forced together as shown and are frictionally held within the aperture. The button head 9 rests in the pile of the carpet.

Figure 11:
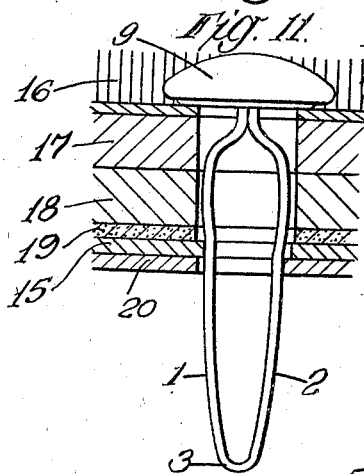

Figure 11 is similar to Figure 10 and illustrates the use of the fastener in a case where the floor is welded to, for example, the tonneau of a vehicle, and the apertures in the floor and tonneau are not quite in alignment. The use of studs in accordance with the present invention renders such slight misalignment of the two apertures immaterial, because the leg 2 of the stud is engaged by the edge of the aperture in the tonneau 20, and the leg 1 by the edge of the aperture in the floor 15, the legs being held frictionally within the apertures.

Figure 12:
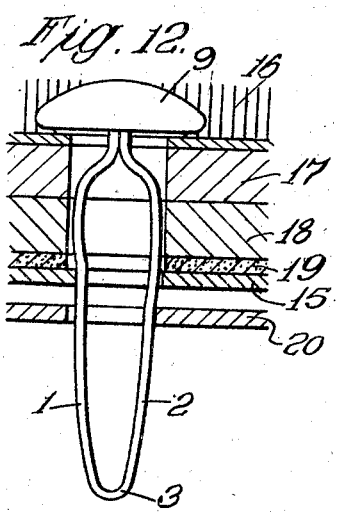

In Figure 12, which is similar to Figure 11, is illustrated the use of the fastener in a case where the opposing faces of the floor and tonneau are not in contact and due, for example, to one or other, or both, being bent. Again it will be appreciated that the legs 1 and 2 engage the edges of the apertures in the floor 15 and tonneau 20, respectively and are frictionally held within the apertures.

The button head and washer may be dispensed with, in which case the stud need not be formed with a neck portion and the feet are so formed that they lie flat upon or in the pile of the carpet.

Figure 13:
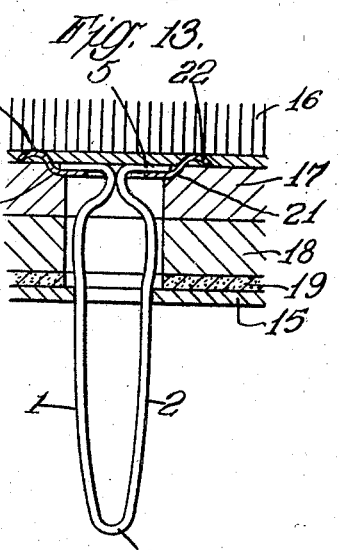
Figures 13 and 14 are views similar to Figures 10, 11 and 12 of still further modifications of the invention.

In Figure 13 is shown a modification of the fastener assembly shown in Figure 10. In this case the feet 5 of the stud, which are preferably not upwardly inclined, are held within an apertured retainer 21 provided with prongs 22 which are passed through the carpet 16 from the underside and clenched over on the upper surface of the carpet, whereby the stud is securely connected to the carpet.

Figures 9A, 14:
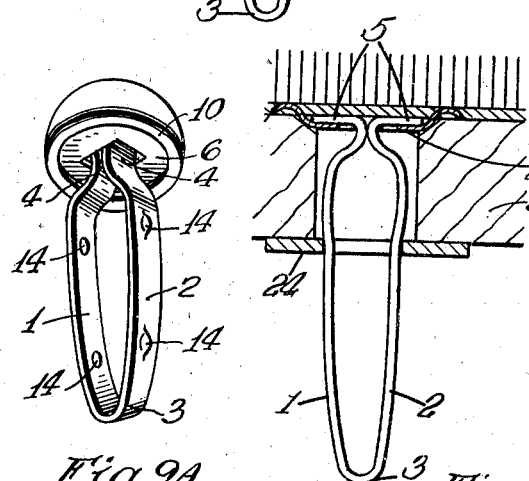

In Figure 14 is shown a further modified form of fastener assembly. The feet 5 of the stud are held in an apertured retainer 21 as immediately above described, but the felts and insulation beneath the carpet are dispensed with and the floor 23 is of wood. The aperture in the floor is sufficiently large to allow the stud to pass freely through it so as to engage the edges of an aperture formed in a steel plate 24 secured to the underside of the floor by screws or otherwise. It will be appreciated that in this arrangement the aperture in the steel plate is spaced from the feet of the stud by a distance approximately equal to the thickness of the floor and that the same fasteners may be used although the thickness of the floors may vary considerably.

Figure 15:
Figure 15 is a similar view to Figure 13 showing the fastener assembly for use in attaching a trim pad to a pillar of a vehicle.

Figure 15 shows a fastener assembly for use in attaching a trim pad to a hollow pillar of a vehicle. The figure is a section taken half-way up the pillar between two doors of a vehicle. An apertured retainer 25, provided with prongs 26 which are driven into the inside face of the pad 27, holds the feet 5 of the stud. The pad 27 is faced on the outside with fabric 28. The hollow steel pillar 29 has welded to its inner edges a U-shaped apertured member 30. The trim pad is secured to the pillar by pressing the legs of the stud partially through apertures in the member 30.

Any of the fasteners described above may be used either where it is desired to hold the two members to be fastened in contact with one another, as in the case of a carpet on a floor, or where it is desired to hold the two members to be fastened in spaced relationship. In the former case, the fastener is pushed through the carpet until the latter embraces the neck of the fastener, as in Figure 10, whereupon the U portion of the fastener is pushed into a hole in the floor until the carpet is in contact with the floor. In the latter case the fastener is pushed through one member, for example a rubber or like beading strip until the strip sits around the neck of the fastener, whereupon the U portion of the fastener is pushed into a hole in the second member for a distance sufficient to bring the two members into the desired spaced relationship.

It will be apparent that in both cases the arrangement has the advantage that when the carpet or beading is removed from the other member the fasteners remain in the removed carpet or beading so that when the carpet or beading is replaced, the fasteners are in their correct position with respect to the holes in the floor of the carpet or other member. Also, it will be apparent that whereas the neck of the fastener engages the carpet by what may be termed a snap action, the U portion of the fastener frictionally engages and is so retained by the member to which the carpet is to be secured.

I claim:

1. A fastener comprising a stud in the form of a single strip of spring metal bent to substantially U-shape, the legs of the U being comparatively long, outwardly bowed and each substantially arcuate to engage an aperture in one of the members to be fastened, and being further formed with a pair of out-turned feet, the free ends of the U being inwardly turned to form a neck portion before being outwardly turned to form said feet, and a cup-shaped washer with an outwardly turned rim encircling said neck portion and a hollow cup housing said feet and washer, said cup-shaped washer being formed with a rectangular aperture, the margins of the longer sides of which are bent out of the plane of the washer towards said cup.

2. A fastener adapted for engagement with a member having an aperture therein comprising a stud in the form of a single strip of spring metal bent to substantially U-shape and formed at one end with inwardly bent neck portions terminating in out-turned feet, the legs of the U being long as compared with their distance apart and being free of any sharp bends in the lengths thereof whereby to avoid critical points over which it is necessary for the fastener to snap when in use, the neck portions being substantially in contact with each other whereby the legs of the stud form a substantially closed elongated loop of gradually decreasing width toward the lower closed extremity thereof, the legs of the fastener being normally so spring biased throughout the major portion of their lengths as to insure frictional retention thereof within said aperture at any point in said major portion of the fastener legs.

3. A fastener adapted for engagement with a member having an aperture therein comprising a stud in the form of a single strip of spring metal bent to substantially U-shape and formed at one end with inwardly bent neck portions terminating in out-turned feet, the legs of the U, when the fastener is inserted in said aperture, serving to grip the edges of the aperture by friction alone, the neck portions being substantially in contact with each other whereby the legs of the stud form a substantially closed elongated loop of gradually decreasing width toward the lower closed extremity thereof, said legs being normally spring biased throughout the major portion of their lengths and being roughly parallel when frictionally retained within said aperture.

4. A fastener as defined in claim 1 wherein each leg has a longitudinal central strip cut away so that it comprises two limbs having a spreading tendency in the plane of the leg including said limbs, said legs themselves being normally spring biased as aforesaid.

5. A fastener as defined in claim 1 wherein the neck portion is located at a point immediately adjoining said out-turned feet.

6. A fastener as defined in claim 1 wherein the feet of the U are loosely held within said hollow cup in such manner that the U may move with respect to the cup.

7. A fastener as defined in claim 2 wherein each leg of the stud has a longitudinal central strip cut-out so as to provide two limbs having a spreading tendency in the plane of the leg including said limbs, said legs themselves being normally spring biased as aforesaid.

8. A fastener as defined in claim 2 wherein the feet of the U are loosely held within said hollow cup in such manner that the U may move angularly with respect to the cup.

ERIC BIRGER FERNBERG.